United States Patent
Zheng

(10) Patent No.: US 8,225,165 B2
(45) Date of Patent: Jul. 17, 2012

(54) METHODS AND DEVICES FOR ENCODING DATA IN COMMUNICATION SYSTEMS

(75) Inventor: Yan-Xiu Zheng, Shulin (TW)

(73) Assignee: Industrial Technology Research Institute, Hsinchu (TW)

( * ) Notice: Subject to any disclaimer, the term of this patent is extended or adjusted under 35 U.S.C. 154(b) by 949 days.

(21) Appl. No.: 12/247,541

(22) Filed: Oct. 8, 2008

(65) Prior Publication Data

US 2009/0100309 A1  Apr. 16, 2009

Related U.S. Application Data

(60) Provisional application No. 60/960,754, filed on Oct. 12, 2007.

(51) Int. Cl.
*H03M 13/00* (2006.01)

(52) U.S. Cl. ........ 714/752; 714/790; 714/776; 714/746; 370/335

(58) Field of Classification Search .................. 714/790, 714/776, 746; 370/335
See application file for complete search history.

(56) References Cited

U.S. PATENT DOCUMENTS

| | | | |
|---|---|---|---|
| 7,210,089 B2 | 4/2007 | Xu et al. | |
| 7,260,770 B2 | 8/2007 | Stewart et al. | |
| 2003/0135811 A1* | 7/2003 | Xu et al. | 714/790 |
| 2003/0190092 A1* | 10/2003 | Dyas et al. | 382/298 |
| 2005/0216819 A1* | 9/2005 | Chugg et al. | 714/786 |
| 2006/0013168 A1* | 1/2006 | Agrawal et al. | 370/335 |
| 2007/0139229 A1* | 6/2007 | Berens | 341/50 |
| 2008/0090517 A1* | 4/2008 | Cheng | 455/39 |
| 2008/0320353 A1* | 12/2008 | Blankenship et al. | 714/746 |
| 2009/0158130 A1* | 6/2009 | Cheun et al. | 714/786 |
| 2009/0164868 A1* | 6/2009 | Anand et al. | 714/758 |

* cited by examiner

*Primary Examiner* — Robert Beausoliel, Jr.
*Assistant Examiner* — Jeison C Arcos
(74) *Attorney, Agent, or Firm* — Finnegan, Henderson, Farabow, Garrett & Dunner, LLP

(57) ABSTRACT

Methods and apparatuses for encoding data in a wireless communication system including receiving an information sequence, and encoding the received information sequence to generate three subblocks of sequences. A first subblock of the three subblocks is the information sequence, a second subblock of the three subblocks is an encoded sequence, and a third subblock of the three subblocks is an interleaved and encoded sequence. The method further includes permuting the three subblocks of encoded sequences separately by subblock permutation, and continuously mapping the three subblocks into a circular buffer, the circular buffer including a first part, a second part, and a third part. Further, the method includes bit-selecting bits from the circular buffer, in a circular order corresponding to the first part, the second part, and the third part, to generate a first redundancy version and a second redundancy version, wherein bit-selection for a first redundancy version of the plurality of redundancy versions begins at a first position in the circular buffer, bit-selection for each successive redundancy version of the plurality of redundancy versions begins after a last position in the circular buffer corresponding to a previous redundancy version, and wherein, when a complete codeword is selected, bit-selection is offset from the first position by a fixed number of bits X. Finally, the method includes transmitting at least one redundancy version of the plurality of redundancy versions to at least one receiving device.

37 Claims, 8 Drawing Sheets ns filed Oct. 12, 2007,
METHODS AND DEVICES FOR ENCODING DATA IN COMMUNICATION SYSTEMS

PRIORITY

This application claims the benefit of priority of U.S. Provisional Application No. 60/960,754, filed Oct. 12, 2007, which is incorporated by reference herein in its entirety for any purpose.

TECHNICAL FIELD

The present disclosure relates generally to methods and devices for communication systems and, more particularly, to methods and devices for encoding data in communication systems.

BACKGROUND

To communicate wirelessly, devices in a wireless communication system may utilize one or more channels, i.e., one-way transmission links through which information or signals are transmitted from a transmitter to a receiver. Depending on the application, these channels may be either physical or logical. For example, a radio frequency (RF) channel is a physical channel, whereas control and traffic channels within the RF channel are considered logical channels.

Due to transmission distances, interference, transmitter and receiver power levels, etc., these channels may, however, be unstable and/or noisy and therefore cause transmission errors in the data. To enhance reliability and maintain data integrity, the devices in a wireless communication system may use a combination of error detection mechanisms to improve the ability of wireless devices to detect errors and error correction mechanisms to enable wireless devices to reconstruct the original, error-free data.

One exemplary mechanism for performing error detection and correction defined in the Institute of Electrical and Electronics Engineers (IEEE) 802.16 family of standards is Hybrid Automatic Repeat Request (HARQ). The HARQ error detection and correction mechanism may use a combination of ACKs, NACKs, and timeouts to communicate the status of transmitted data. Exemplary HARQ protocols may include Stop-And-Wait (SAW), Go-Back-N, and Selective Repeat.

Using HARQ, a transmitter may send data along with an error detection code which the receiver may use to check for errors in the data and, if the data is either not received by the intended recipient or received with errors, the transmitter may retransmit the data. One exemplary method of error detection is a redundancy check. For example, in a wireless communication system that uses a "systematic" error detection code, the transmitter may transmit a fixed number of original data bits (i.e., the systematic portion of the data), followed by a fixed number of parity bits (sometimes referred to as the redundancy portion) which are derived from the original data bits by a predetermined algorithm (i.e., encoded). Upon receipt of the data (systematic and parity bits), the receiver applies the predetermined algorithm to the systematic portion of the data, and compares the output of the algorithm to the received parity bits. If the values do not match, the receiver determines that an error has occurred and, in some cases, may initiate one or more error correction mechanisms.

Two main variants of HARQ encoding may be supported in a wireless system employing IEEE 802.16: incremental redundancy (IR) and chase combining (CC). Using IR and CC, the physical (PHY) layer may perform bit selection on a data packet to generate several different redundancy versions (RVs). In IR, a different redundancy version is sent for each retransmission, whereas in CC the same redundancy version is sent for the initial transmission as well as each retransmission. The IEEE 802.16 family of standards defines a bit selection method for both CC and IR in which there are four redundancy versions, i.e., RV0, RV1, RV2, and RV3.

In addition, the HARQ mechanism may incorporate a Cyclic Redundancy Check (CRC) and channel coding. A CRC is a function that takes the received data as input, and outputs a checksum value. For example, using CRC, if the first transmission is incorrect, i.e., the decoded data fails CRC verification, the transmitter will retransmit the data using the same redundancy version or another redundancy version. When multiple RVs are transmitted, either the same RV or a different RV, the receiver may be configured to combine and decode the multiple RVs to improve performance of the error correction mechanisms.

An exemplary method of channel coding used in the IEEE 802.16 family of standards is Convolutional Turbo Code (CTC). CTC is a Forward Error Correction (FEC) mechanism by which the transmitter encodes the data with an error correcting code (ECC), and sends the encoded data to a receiver. When CTC encoding is used, the systematic portion of the data enables iterative decoding, and the parity portion of the data determines the error rate performance of the iterative decoding.

However, when performing bit selection during decoding, the CTC method can negatively impact HARQ performance. For example, IEEE 802.16 defines the four redundancy versions (e.g., RV0, RV1, RV2, and RV3), each of the redundancy versions including the systematic portion and differing subportions of the parity portion. The CTC bit selection method will choose the systematic portion in advance, and then choose the subportion of the parity portion. If all code bits (systematic and parity) are selected, traditional bit selection methods will select the systematic portion again. However, by selecting more parity bits in subsequent RVs when all code bits have been selected, the bit selection method could be further improved.

The disclosed embodiments are directed to overcoming one or more of the problems set forth above.

SUMMARY OF THE INVENTION

In one exemplary embodiment, the present disclosure is directed to a method for encoding data in a wireless communication system, comprising: receiving an information sequence; encoding the received information sequence to generate three subblocks of sequences, wherein a first subblock of the three subblocks is the information sequence, a second subblock of the three subblocks is an encoded sequence, and a third subblock of the three subblocks is an interleaved and encoded sequence; permuting the three subblocks of encoded sequences separately by subblock permutation; inter-subblock permuting the second subblock and the third subblock to generate a fourth subblock and a fifth subblock; continuously mapping the first subblock, the fourth subblock, and the fifth subblock into a circular buffer, the circular buffer including a first part, a second part, and a third part; bit-selecting bits from the circular buffer, in a circular order corresponding to the first part, the second part, and the third part, to generate a plurality of redundancy versions, wherein bit-selection for a first redundancy version of the plurality of redundancy versions begins at a first position in the circular buffer, bit-selection for each successive redundancy version of the plurality of redundancy versions begins after a last position in the circular buffer corresponding to a previous redundancy version, and wherein, when a complete codeword is selected, bit-selection is offset from the first position by a fixed number of bits X; and transmitting at least one redundancy version of the plurality of redundancy versions to at least one receiving device.

In another exemplary embodiment, the present disclosure is directed to an apparatus for bit-selection in a wireless communication system, comprising: at least one circular buffer including a first part, a second part, and a third part; at least one encoding unit configured to: receive an information sequence, and encode the received information sequence to generate three subblocks of sequences, wherein a first subblock of the three subblocks is the information sequence, a second subblock of the three subblocks is an encoded sequence, and a third subblock of the three subblocks is an interleaved and encoded sequence; and at least one permuting unit configured to: permute the three subblocks of encoded sequences separately by subblock permutation; inter-subblock permute the second subblock and the third subblock to generate a fourth subblock and a fifth subblock; continuously map the first subblock, the fourth subblock, and the fifth subblock into the at least one circular buffer, bit-select bits from the at least one circular buffer, in a circular order corresponding to the first part, the second part, and the third part, to generate a plurality of redundancy versions, wherein bit-selection for a first redundancy version of the plurality of redundancy versions begins at a first position in the circular buffer, bit-selection for each successive redundancy version of the plurality of redundancy versions begins after a last position in the circular buffer corresponding to a previous redundancy version, and wherein, when a complete codeword is selected, bit-selection is offset from the first position by a fixed number of bits X, and output at least one redundancy version of the plurality of redundancy versions for transmission to at least one receiving device.

In one exemplary embodiment, the present disclosure is directed to a method for symbol selection in a wireless communication system, comprising: receiving a first information sequence and a second information sequence; encoding the received first information sequence and the received second information sequence to generate six subblocks of sequences, wherein a first subblock of the six subblocks is the first information sequence, a second subblock of the six subblocks is the second information sequence, a third subblock of the six subblocks is an encoded sequence, a fourth subblock of the six subblocks is an encoded sequence, a fifth subblock of the six subblocks is an interleaved and encoded sequence, and a sixth subblock of the six subblocks is an interleaved and encoded sequence; permuting the six subblocks of encoded sequences separately by subblock permutation; inter-subblock permuting the third subblock and the fifth subblock to generate a seventh and a ninth subblock; inter-subblock permuting the fourth subblock and the sixth subblock to generate an eighth and a tenth subblock; continuously mapping the first subblock, the second subblock, the seventh subblock, the eighth subblock, the ninth subblock, and the tenth subblock into a circular buffer, the circular buffer including a first part, a second part, a third part, a fourth part, a fifth part, and a sixth part; bit-selecting bits from the circular buffer, in a circular order corresponding to the first part, the second part, the third part, the fourth part, the fifth part, and the sixth part, to generate a plurality of redundancy versions, wherein bit-selection for a first redundancy version of the plurality of redundancy versions begins at a first position in the circular buffer, bit-selection for each successive redundancy version of the plurality of redundancy versions begins after a last position in the circular buffer corresponding to a previous redundancy version, and wherein, when a complete codeword is selected, bit-selection is offset from the first position by a fixed number of bits X; and transmitting at least one redundancy version of the plurality of redundancy versions to at least one receiving device.

In another exemplary embodiment, the present disclosure is directed to an apparatus for bit selection in a wireless communication system, comprising: at least one circular buffer including a first part, a second part, a third part, a fourth part, a fifth part, and a sixth part; at least one encoding unit configured to: receive a first information sequence and a second information sequence, and encode the received first information sequence and the received second information sequence to generate six subblocks of sequences, wherein a first subblock of the six subblocks is the first information sequence, a second subblock of the six subblocks is the second information sequence, a third subblock of the six subblocks is an encoded sequence, a fourth subblock of the six subblocks is an encoded sequence, a fifth subblock of the six subblocks is an interleaved and encoded sequence, and a sixth subblock of the six subblocks is an interleaved and encoded sequence; and at least one permuting unit configured to: permute the six subblocks of encoded sequences separately by subblock permutation, inter-subblock permute the third subblock and the fifth subblock to generate a seventh and a ninth subblock, inter-subblock permute the fourth subblock and the sixth subblock to generate an eighth and a tenth subblock, continuously map the first subblock, the second subblock, the seventh subblock, the eighth subblock, the ninth subblock, and the tenth subblock into the at least one circular buffer, bit-select bits from the at least one circular buffer, in a circular order corresponding to the first part, the second part, the third part, the fourth part, the fifth part, and the sixth part, to generate a plurality of redundancy versions, wherein bit-selection for a first redundancy version of the plurality of redundancy versions begins at a first position in the circular buffer, bit-selection for each successive redundancy version of the plurality of redundancy versions begins after a last position in the circular buffer corresponding to a previous redundancy version, and wherein, when a complete codeword is selected, bit-selection is offset from the first position by a fixed number of bits X, and output at least one redundancy version of the plurality of redundancy versions for transmission to at least one receiving device.

In one exemplary embodiment, the present disclosure is directed to a method for symbol selection in a wireless communication system, comprising: receiving a first information sequence and a second information sequence; encoding the received first information sequence and the received second information sequence to generate six subblocks of sequences, wherein a first subblock of the six subblocks is the first information sequence, a second subblock of the six subblocks is the second information sequence, a third subblock of the six subblocks is an encoded sequence, a fourth subblock of the six subblocks is an encoded sequence, a fifth subblock of the six subblocks is an interleaved and encoded sequence, and a sixth subblock of the six subblocks is an interleaved and encoded sequence; permuting the six subblocks of encoded sequences separately by subblock permutation; inter-subblock permuting the first subblock and the second subblock to generate a seventh and an eighth subblock; inter-subblock permuting the third subblock and the fifth subblock to generate a ninth and an eleventh subblock; inter-subblock permuting the fourth subblock and the sixth subblock to generate a tenth and a twelfth subblock; continuously mapping the seventh subblock, the eighth subblock, the ninth subblock, the tenth subblock, the eleventh subblock, and the twelfth subblock into a circular buffer, the circular buffer including a first part, a second part, a third part, a fourth part, a fifth part, and a sixth part; bit-selecting bits from the circular buffer, in a circular order corresponding to the first part, the second part, the third part, the fourth part, the fifth part, and the sixth part, to generate a plurality of redundancy versions, wherein bit-selection for a first redundancy version of the plurality of redundancy versions begins at a first position in the circular buffer, bit-selection for each successive redundancy version of the plurality of redundancy versions begins after a last position in the circular buffer corresponding to a previous redundancy version, and wherein, when a complete codeword is selected, bit-selection is offset from the first position by a fixed number of bits X; and transmitting at least one redundancy version of the plurality of redundancy versions to at least one receiving device.

In another exemplary embodiment, the present disclosure is directed to an apparatus for bit selection in a wireless communication system, comprising: at least one circular buffer including a first part, a second part, a third part, a fourth part, a fifth part, and a sixth part; at least one encoding unit configured to: receive a first information sequence and a second information sequence, and encode the received first information sequence and the received second information sequence to generate six subblocks of sequences, wherein a first subblock of the six subblocks is the first information sequence, a second subblock of the six subblocks is the second information sequence, a third subblock of the six subblocks is an encoded sequence, a fourth subblock of the six subblocks is an encoded sequence, a fifth subblock of the six subblocks is an interleaved and encoded sequence, and a sixth subblock of the six subblocks is an interleaved and encoded sequence; and at least one permuting unit configured to: permute the six subblocks of encoded sequences separately by subblock permutation; inter-subblock permute the first subblock and the second subblock to generate a seventh and an eighth subblock; inter-subblock permute the third subblock and the fifth subblock to generate a ninth and an eleventh subblock; inter-subblock permute the fourth subblock and the sixth subblock to generate a tenth and a twelfth subblock; continuously map the seventh subblock, the eighth subblock, the ninth subblock, the tenth subblock, the eleventh subblock, and the twelfth subblock into a circular buffer, the circular buffer including a first part, a second part, a third part, a fourth part, a fifth part, and a sixth part; bit-select bits from the at least one circular buffer, in a circular order corresponding to the first part, the second part, the third part, the fourth part, the fifth part, and the sixth part, to generate a plurality of redundancy versions, wherein bit-selection for a first redundancy version of the plurality of redundancy versions begins at a first position in the circular buffer, bit-selection for each successive redundancy version of the plurality of redundancy versions begins after a last position in the circular buffer corresponding to a previous redundancy version, and wherein, when a complete codeword is selected, bit-selection is offset from the first position by a fixed number of bits X, and output at least one redundancy version of the plurality of redundancy versions for transmission to at least one receiving device.

In another exemplary embodiment, the present disclosure is directed to a method for encoding data in a wireless communication system, comprising: receiving an information sequence; encoding the received information sequence by turbo code encoding to generate a coded sequence including a coded information sequence and a coded parity sequence; bit-selecting from the coded sequence to obtain a plurality of redundancy versions for Hybrid Automatic Request (HARQ) transmissions, wherein a first transmission bit-selects from the coded information sequence and a part of the coded parity sequence, a next transmission bit-selects from the coded sequence not selected during the first transmission, and when a complete codeword is chosen once, a subsequent transmission bit-selects first from the parity sequence and then bit-selects from the information sequence.

DETAILED DESCRIPTION

Figure 1:
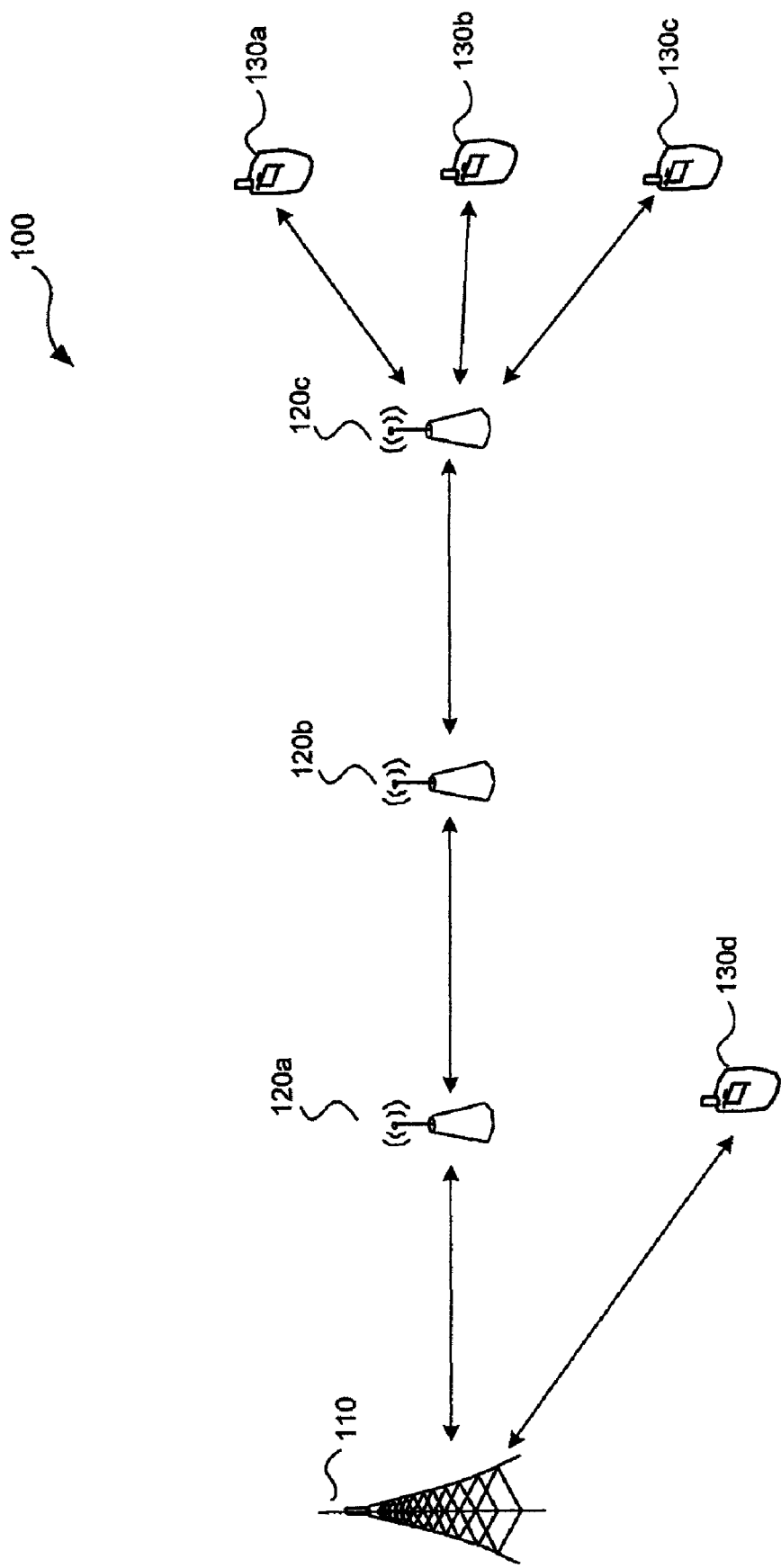
FIG. 1 is a block diagram of an exemplary wireless communication system, consistent with certain disclosed embodiments.

FIG. 1 is a block diagram of an exemplary wireless communication system 100. The exemplary wireless communication system 100 of FIG. 1 may be based, for example, on the Institute of Electrical and Electronics Engineers (IEEE) 802.16 family of standards and, in particular, IEEE 802.16e. As shown in FIG. 1, wireless communication system 100 may include one or more base stations (BS) 110, e.g., BS 110, one or more relay stations (RS) 120, e.g., RS 120a, RS 120b, and RS 120c, and one or more subscriber stations (SS) 130, e.g., SS 130a, SS 130b, SS 130c, and SS 130d.

BS 110 may be any type of communication device configured to transmit and/or receive data and/or communications to and from one or more RSs 120 and/or SSs 130 in wireless communication system 100, many of which are known in the art. In some embodiments, BS 110 may also be referred to as, for example, a Node-B, a base transceiver system (BTS), an access point, etc. In one exemplary embodiment, BS 110 may have a broadcast/reception range within which BS 110 may wirelessly communicate with one or more RSs 120 and/or one or more SSs 130. Broadcast ranges may vary due to power levels, location, and interference (physical, electrical, etc.).

Figure 2:
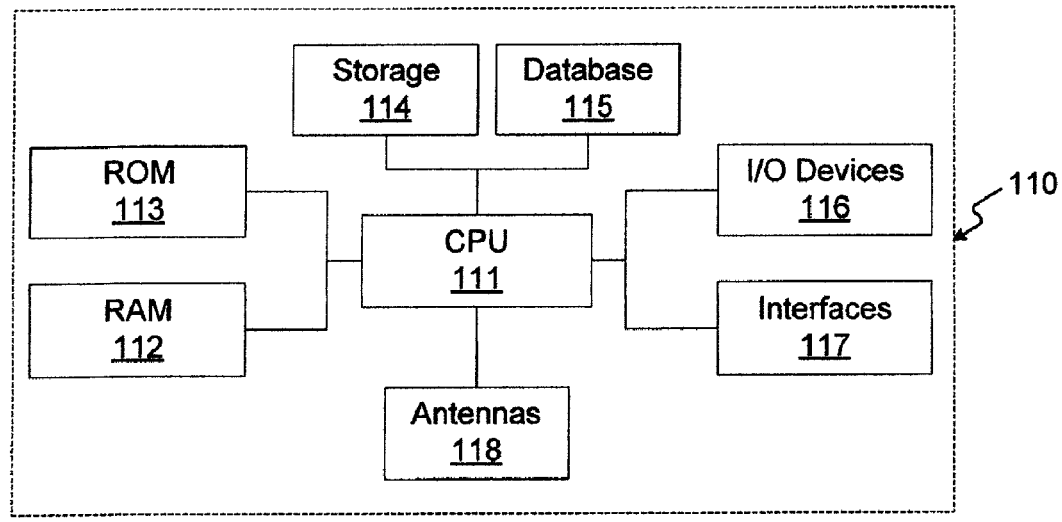
FIG. 2 is a block diagram of an exemplary base station (BS), consistent with certain disclosed embodiments.

FIG. 2 is a block diagram of an exemplary BS 110, consistent with certain disclosed embodiments. As shown in FIG. 2, each BS 110 may include one or more of the following components: at least one central processing unit (CPU) 111 configured to execute computer program instructions to perform various processes and methods, random access memory (RAM) 112 and read only memory (ROM) 113 configured to access and store information and computer program instructions, memory 114 to store data and information, databases 115 to store tables, lists, or other data structures, I/O devices 116, interfaces 117, antennas 118, etc. Each of these components is well-known in the art and will not be discussed further.

RS 120 may be any type of computing device configured to wirelessly transmit and/or receive data to and from BS 110, one or more other RSs 120, and/or one or more SSs 130 in wireless communication system 100, many of which are known in the art. Communication between RS 120 and BS 110, one or more other RSs 120, and one or more SSs 130 may be wireless. In one exemplary embodiment, RS 120 may have a broadcast/reception range within which RS 120 may wirelessly communicate with BS 110, one or more other RSs 120, and/or one or more SSs 130. Broadcast ranges may vary due to power levels, location, and interference (e.g., physical, electrical, etc.).

Figure 3:
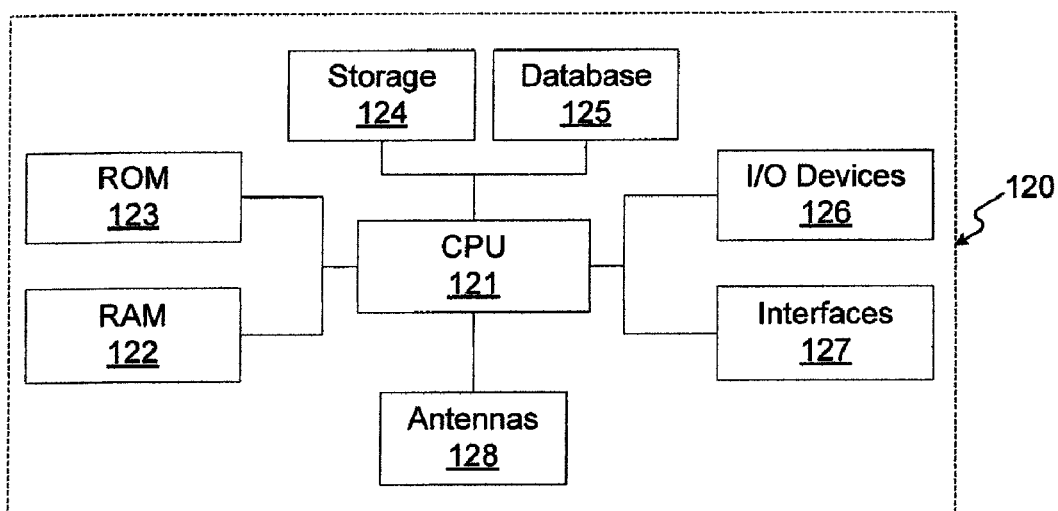
FIG. 3 is a block diagram of an exemplary relay station (RS), consistent with certain disclosed embodiments.

FIG. 3 is a block diagram of an exemplary RS 120, consistent with certain disclosed embodiments. As shown in FIG. 3, each RS 120 may include one or more of the following components: at least one central processing unit (CPU) 121 configured to execute computer program instructions to perform various processes and methods, random access memory (RAM) 122 and read only memory (ROM) 123 configured to access and store information and computer program instructions, memory 124 to store data and information, databases 125 to store tables, lists, or other data structures, I/O devices 126, interfaces 127, antennas 128, etc. Each of these components is well-known in the art and will not be discussed further.

Although not shown, RS 120 may include one or more mechanisms and/or devices by which RS 120 may perform the methods as described herein. For example, RS 120 may include one or more encoders, one or more interleavers, one or more circular buffers, one or more multiplexers, one or more permuters, one or more arithmetic logic units and/or their constituent parts, etc. These mechanisms and/or devices may include any combination of hardware and/or software components.

SS 130 may be any type of computing device configured to wirelessly transmit and/or receive data to and from BS 110 and/or one or more RSs 120 in wireless communication system 100. SS 130 may include, for example, servers, clients, desktop computers, laptop computers, network computers, workstations, personal digital assistants (PDA), tablet PCs, scanners, telephony devices, pagers, cameras, musical devices, etc. In addition, SS 130 may include one or more wireless sensors in a wireless sensor network configured to communicate by means of centralized and/or distributed communication. In one exemplary embodiment, SS 130 may be a mobile computing device. In another exemplary embodiment, SS 130 may be a fixed computing device operating in a mobile environment, such as, for example, a bus, a train, an airplane, a boat, a car, etc.

Figure 4:
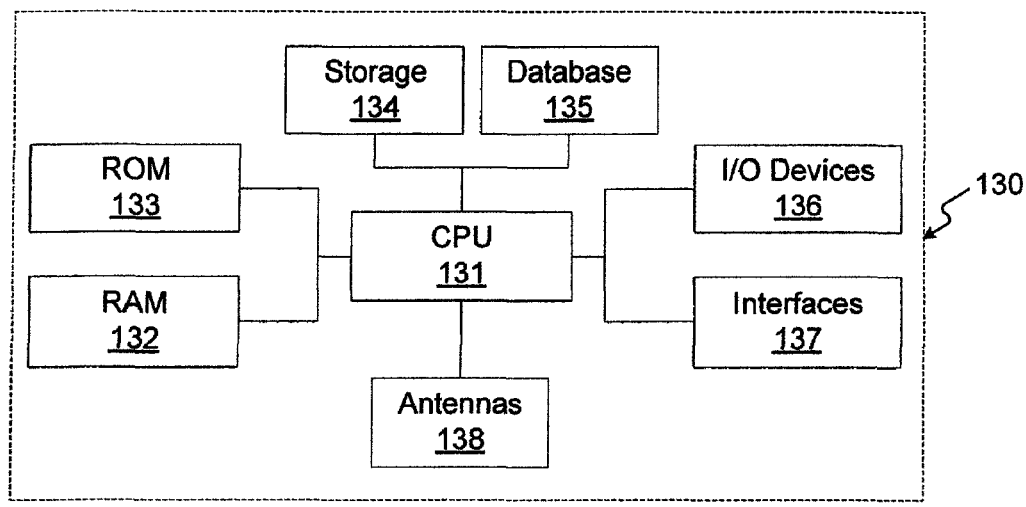
FIG. 4 is a block diagram of an exemplary subscriber station (SS), consistent with certain disclosed embodiments.

FIG. 4 is a block diagram of an exemplary SS 130, consistent with certain disclosed embodiments. As shown in FIG. 4, each SS 130 may include one or more of the following components: at least one central processing unit (CPU) 131 configured to execute computer program instructions to perform various processes and methods, random access memory (RAM) 132 and read only memory (ROM) 133 configured to access and store information and computer program instructions, memory 134 to store data and information, databases 135 to store tables, lists, or other data structures, I/O devices 136, interfaces 137, antennas 138, etc. Each of these components is well-known in the art and will not be discussed further.

Although not shown, SS 130 may include one or more mechanisms and/or devices by which SS 130 may perform the methods as described herein. For example, SS 130 may include one or more encoders, one or more interleavers, one or more circular buffers, one or more multiplexers, one or more permuters, one or more arithmetic logic units and/or their constituent parts, etc. These mechanisms and/or devices may include any combination of hardware and/or software components.

Wireless systems, such as those implementing IEEE 802.16e, may utilize a Media Access Control (MAC) frame format using Orthogonal Frequency-Division Multiple Access (OFDMA). In such a wireless system, transmissions may be divided into variable length sub-frames: an uplink (UL) sub-frame and a downlink (DL) sub-frame. Generally, the UL sub-frame may include ranging channels, a channel quality information channel (CQICH), and UL data bursts containing data.

The DL sub-frame may include a preamble, a Frame Control Header (FCH), a DL-MAP, a UL-MAP, and a DL data burst area. The preamble may be used to provide a reference for synchronization. For example, the preamble may be used to adjust a timing offset, a frequency offset, and power. The FCH may contain frame control information for each connection including, for example, modulation and coding information for the receiving device.

The DL-MAP and UL-MAP may be used to allocate channel access for both uplink and downlink communications. That is, the DL-MAP may provide a directory of access slot locations within the current downlink sub-frame, and the UL-MAP may provide a directory of access slot locations within the current uplink sub-frame. In the DL-MAP, this directory may take the form of one or more DL-MAP Information Elements (MAP IEs). Each MAP IE in the DL-MAP may contain parameters for a single connection (i.e., the connection with a single receiving device). These parameters may be used to identify where, in the current sub-frame, a data burst may be located, the length of the data burst, the identity of the intended recipient of the data burst, and one or more transmission parameters.

For example, each MAP IE may contain a Connection ID (CID), identifying the destination device for which a data burst is intended, a Downlink Interval Usage Code (DIUC), representing a downlink interval usage code by which downlink transmission is defined, an OFDMA Symbol Offset, indicating the offset of the OFDMA symbol in which a data burst starts, a sub-channel offset, indicating the lowest-index OFDMA sub-channel for carrying the burst, etc. Other parameters may also be included in the MAP IE such as, for example, a boosting parameter, a parameter indicating a number of OFDMA symbols, a parameter indicating a number of sub-channels, etc. An OFDMA symbol may be the number of carriers equal to the size of a Fourier transform, and may be constructed from data carriers, pilot carriers, null carriers, etc.

The DL-MAP and UL-MAP may each be followed by the data burst area. The data burst area may include one or more data bursts. Each data burst in the data burst area may be modulated and encoded according to the control type of a corresponding connection-switched control data. Generally, the DL and UL sub-frames may be referred to as packet data units (PDUs) or simply packet data.

Figure 5:
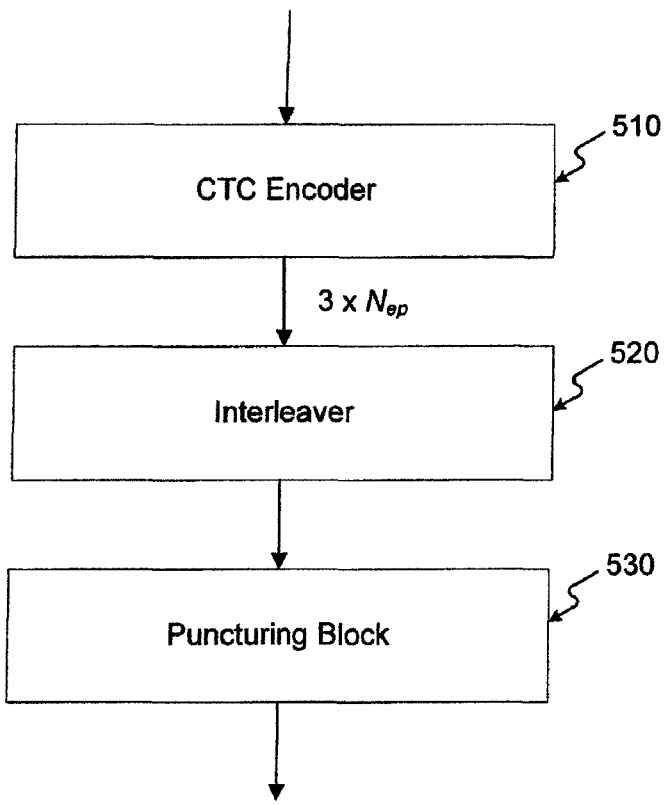
FIG. 5 is a functional block diagram illustrating exemplary packet data processing, consistent with certain disclosed embodiments.

FIG. 5 is a functional block diagram illustrating subpacket generation in, for example, an incremental redundancy (IR) encoding scheme. As discussed above, using IR, the PHY layer will encode the HARQ packet data unit (PDU) thereby generating several versions of encoded subpackets. For example, a transmitting device (e.g., BS 110, RS 120, etc.) may create a first Redundancy Version, i.e., Redundancy Version 0 (RV0), of HARQ PDU, and then transmit RV0 of HARQ PDU to a receiving device (e.g., RS 120, SS 130, etc.). For each retransmission of HARQ PDU, the transmitting device may create a subsequent Redundancy Version (RV) (i.e., RV1, RV2, etc.) of HARQ PDU and transmit the subsequent RVs to the receiving device.

As shown in FIG. 5, data may be received by a convolutional turbo code (CTC) encoder 510. In some embodiments, CTC encoder 510 may be configured to perform binary CTC encoding. In other embodiments, CTC encoder 510 may be configured to perform duo-binary CTC encoding. The rate of CTC encoder 510 may be defined as m/n, where an m-bit information sequence is encoded into an n-bit coded sequence. An information sequence may be, for example, a series of bits corresponding to transmission data. Thus, in a ⅓ CTC encoder 510, a 48-bit information sequence may be encoded into a 144-bit coded sequence. Although a ⅓ rate encoder is disclosed, other code rates are anticipated. For example, CTC encoder 510 may have a code rate of ⅓, ½, ⅔, ¾, ⅚, etc. As shown in FIG. 5, the output of a ⅓ CTC encoder 510 may be $3 \times N_{EP}$, where $N_{EP}$ is the number of bits in the data packet prior to encoding.

Figure 6:
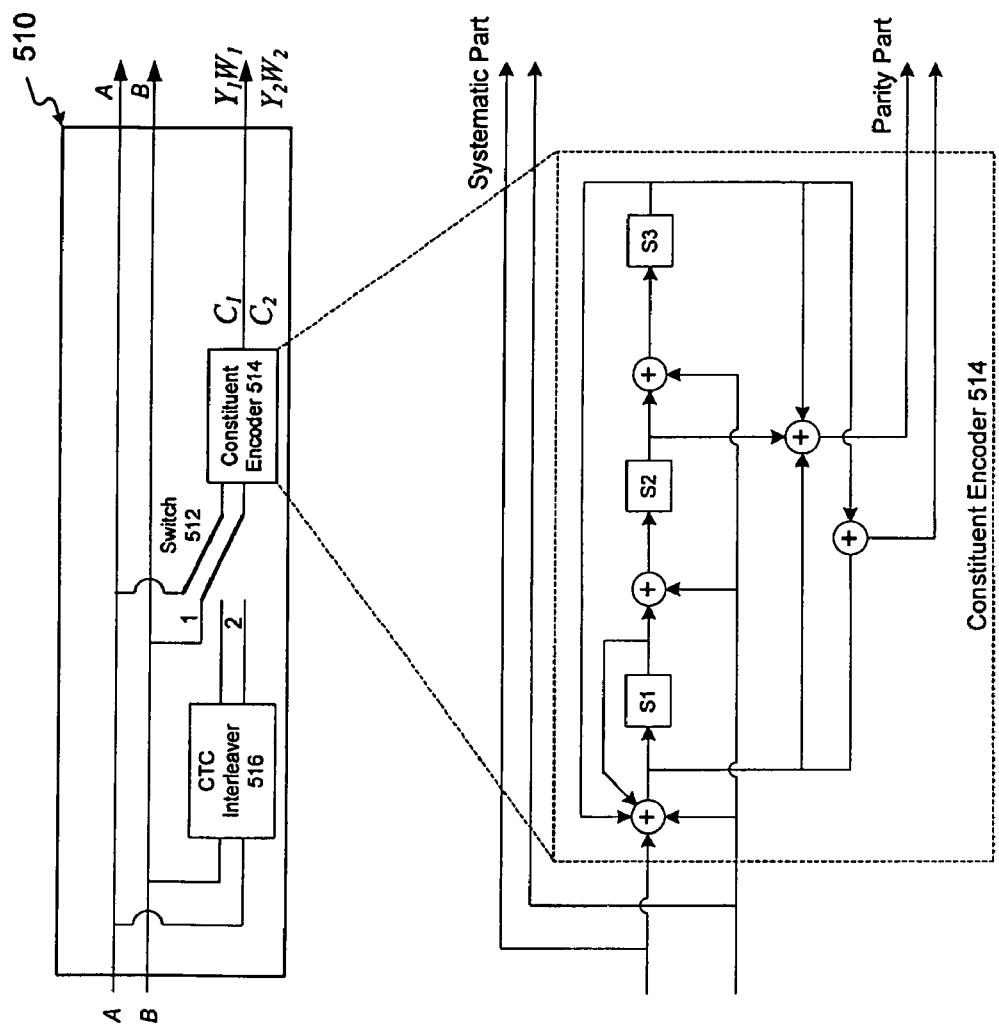
FIG. 6 is a block diagram illustrating an exemplary convolutional turbo code (CTC) encoder, consistent with certain disclosed embodiments.

FIG. 6 shows an exemplary ⅓ CTC encoder 510. As shown in FIG. 6, CTC encoder 510 is configured to perform duo-binary CTC encoding. CTC encoder 510 may include a switch 512, a constituent encoder 514, and a CTC interleaver 516. As shown in FIG. 6, the bits of the data to be encoded, i.e., information sequences, are alternately sent to A and B. CTC encoder 510 may, for example, receive two N-bit information sequences to both A and B. CTC encoder 510 may output a stream of bit pairs $A_i$, $B_i$, where $A_i$ and $B_i$ are the i-th bits of the input sequences A and B, and may be understood to be the systematic (message) part of the encoded data.

With switch 512 in position 1, constituent encoder 514 of CTC encoder 510 may receive the bit pair $A_i$, $B_i$ in order with the incremental address i=0, 1, . . . , N−1, where N is the number of couples. This first encoding is called $C_1$ encoding, and the output bit pair of the $C_1$ encoding is $Y_1$, $W_1$. As shown in FIG. 6, an exemplary constituent encoder 514 may include various components and mechanisms, such as, for example, adders, registers, etc. The components and mechanisms of constituent encoder 516 are well-known in the art and will not be discussed herein further.

CTC interleaver 516 may also receive bit pair ($A_i$, $B_i$), and perform a two-step process to interleave the received bit pair. Although not shown, CTC interleaver 516 may require one or more input parameters that may vary according to the data block size, the encoded data block size, the code rate, and the desired modulation. These one or more parameters may be defined by one or more standards, such as, for example, IEEE 802.16e.

The output of CTC interleaver 516 may be provided to constituent encoder 514 via switch 512. For example, with switch 512 in position 2, constituent encoder 514 may receive the interleaved sequence (i.e., the output of CTC interleaver 516) with incremental addressing of j=0, . . . , N−1, where N is the number of couples. This second encoding is referred to as the $C_2$ encoding, and the output bit pair of the $C_2$ encoding is $Y_2$, $W_2$. The output of the $C_1$ and $C_2$ encodings may be understood to be the parity part of the encoded data.

Referring again to FIG. 5, the output of CTC encoder 510 may be sent to interleaver 520. Interleaver 520 may be used to multiplex the data subblocks output by CTC encoder 510 (e.g., A, B, $Y_1$, $W_1$, $Y_2$, $W_2$). In one exemplary embodiment, subblock interleaving may be performed on a symbol-by-symbol basis. The entire subblock of symbols to be interleaved is written into a memory array at addresses ranging from 0 to the number of the symbols minus 1 (i.e., 0 to N−1), where N is the number of symbols.

Once the subblock of symbols to be interleaved is stored, interleaver parameters m and J are determined, and variables i and k are initialized to 0. A tentative output address $T_k$ for the symbols may be obtained according to the following formula:

$$T_k = 2^m(k \bmod J) + BRO_m([k/J]), \quad \text{Equation 1}$$

where $BRO_m(y)$ indicates the bit-reversed m-bit value of y (e.g., $BRO_3(6)=3$).

Using Equation 1, if $T_k$ is less than N and an i-th storage address $AD_i=T_k$, then i and k may be incremented by 1. If $T_k$ is greater than or equal to N. then $T_k$ may be discarded and k may be incremented by 1. Equation 1 and the subsequent comparison may be repeated until output addresses for all N symbols are obtained.

Once interleaving is complete, the interleaved symbols may be read out of the memory array in a permutation mapped order with the i-th symbol being read from an i-th storage address $AD_i$ (i=0, . . . , N−1) using the interleaver subblock parameters m and J. Generally, permutation maps the sub-channels to physical subcarriers in the OFDMA symbol.

Exemplary interleaver subblock parameters m and J are shown in Table 1.

TABLE 1

Subblock Interleaver Parameters

| Block Size (bits) $N_{EP}$ | N | m | J |
|---|---|---|---|
| 48 | 24 | 3 | 3 |
| 96 | 48 | 4 | 3 |
| 144 | 72 | 5 | 3 |
| 192 | 96 | 5 | 3 |
| 288 | 144 | 6 | 3 |
| 384 | 192 | 6 | 3 |
| 480 | 240 | 7 | 2 |
| 960 | 480 | 8 | 2 |
| 1920 | 960 | 9 | 2 |
| 2880 | 1440 | 9 | 3 |
| 3840 | 1920 | 10 | 2 |
| 4800 | 2400 | 10 | 3 |

Figure 7A:
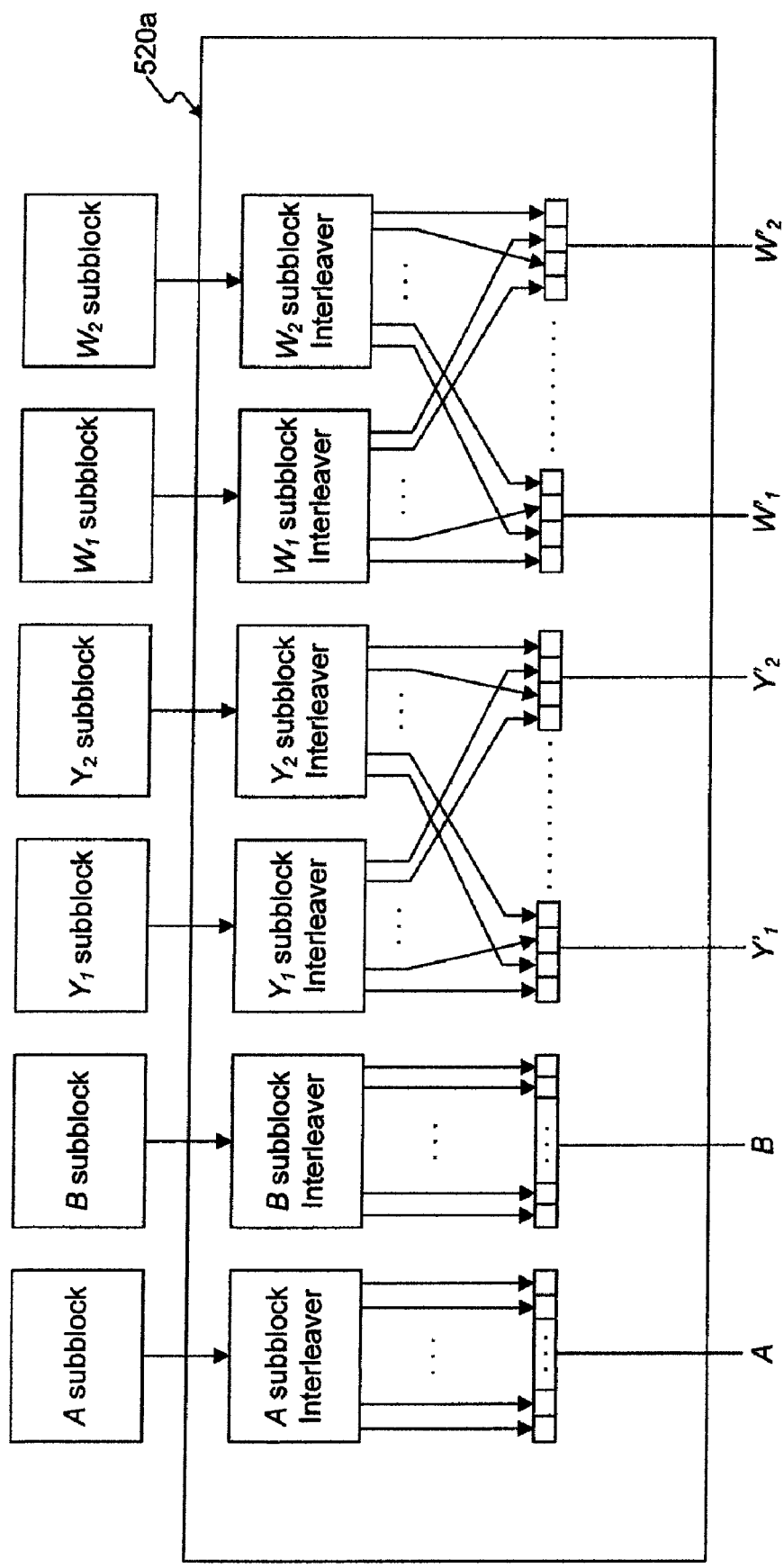
FIG. 7a is a block diagram illustrating an exemplary data interleaver, consistent with certain disclosed embodiments.
Figure 7B:
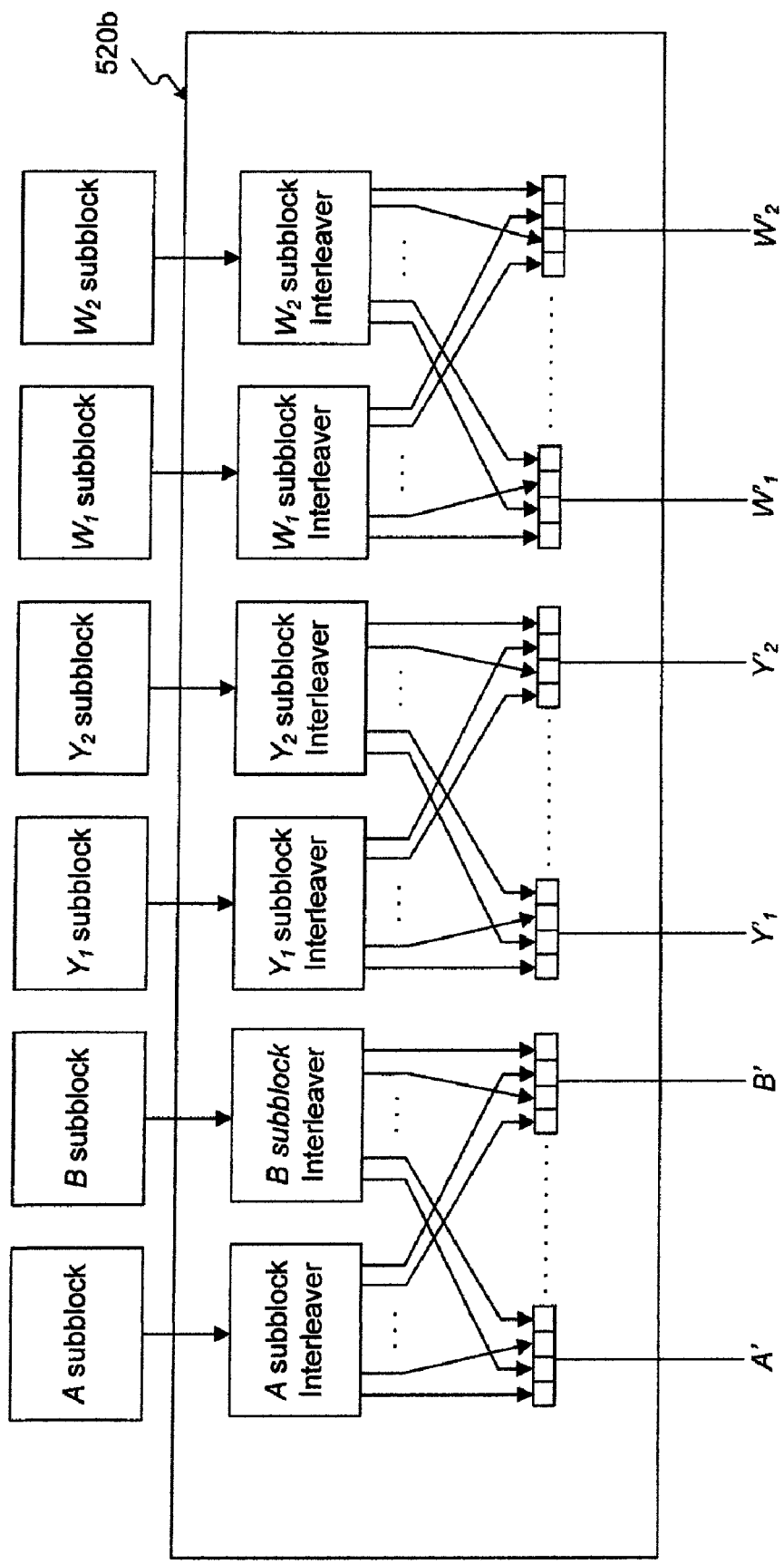
FIG. 7b is a block diagram illustrating an exemplary data interleaver, consistent with certain disclosed embodiments.

FIGS. 7a and 7b respectively show two different exemplary embodiments of interleaver 520. An interleaver 520a, as shown in FIG. 7a, may receive the data subblocks output from CTC encoder 510, i.e., subblocks A, B, $Y_1$, $Y_2$, $W_1$, $W_2$, and may interleave subblocks A, B, $Y_1$, $Y_2$, $W_1$, $W_2$. In addition, interleaver 520a may inter-block permute $Y_1$ and $Y_2$ to generate $Y'_1$ and $Y'_2$, and inter-block permute $W_1$ and $W_2$ to generate $W'_1$ and $W'_2$. Thus, as shown in FIG. 7a, the output of interleaver 520a may be A, B, $Y'_1$, $Y'_2$, $W'_1$, $W'_2$.

More specifically, the channel interleaver output sequence of interleaver 520a may be the interleaved A and B subblock sequence, followed by a symbol-by-symbol multiplexed sequence of the interleaved $Y_1$ and $Y_2$ subblock sequences, followed by a symbol-by-symbol multiplexed sequence of the interleaved $W_1$ and $W_2$ subblock sequences. The symbol-by-symbol multiplexed sequence of interleaved $Y_1$ and $Y_2$ subblock sequences may consist of the first output bit from the $Y_1$ subblock interleaver, the first output bit from the $Y_2$ subblock interleaver, the second output bit from the $Y_1$ subblock interleaver, the second output bit from the $Y_2$ subblock interleaver, etc. Similarly, the symbol-by-symbol multiplexed sequence of interleaved $W_1$ and $W_2$ subblock sequences may consist of the first output bit from the $W_1$ subblock interleaver, the first output bit from the $W_2$ subblock interleaver, the second output bit from the $W_1$ subblock interleaver, the second output bit from the $W_2$ subblock interleaver, etc.

Similarly to interleaver 520a, interleaver 520b, as shown in FIG. 7b, may receive the data subblocks output from CTC encoder 510, i.e., subblocks A, B, $Y_1$, $Y_2$, $W_1$, $W_2$, and may interleave subblocks A, B, $Y_1$, $Y_2$, $W_1$, $W_2$. As with interleaver 520a, interleaver 520b may inter-block permute $Y_1$ and $Y_2$ to generate $Y'_1$ and $Y'_2$, and inter-block permute $W_1$ and $W_2$ to generate $W'_1$ and $W'_2$. However, interleaver 520b may also inter-block permute A and B to generate A' and B'. Thus, as shown in FIG. 7b, the output of interleaver 520b may be A', B', $Y'_1$, $Y'_2$, $W'_1$, $W'_2$.

More specifically, the channel interleaver output sequence of interleaver 520b may be a symbol-by-symbol multiplexed sequence of the interleaved A and B subblock sequences, followed by a symbol-by-symbol multiplexed sequence of the interleaved $Y_1$ and $Y_2$ subblock sequences, followed by a symbol-by-symbol multiplexed sequence of the interleaved $W_1$ and $W_2$ subblock sequences. The symbol-by-symbol multiplexed sequence of interleaved A and B subblock sequences may consist of the first output bit from the A subblock interleaver, the first output bit from the B subblock interleaver, the second output bit from the A subblock interleaver, the second output bit from the B subblock interleaver, etc. The symbol-by-symbol multiplexed sequence of interleaved $Y_1$ and $Y_2$ subblock sequences may consist of the first output bit from the $Y_1$ subblock interleaver, the first output bit from the $Y_2$ subblock interleaver, the second output bit from the $Y_1$ subblock interleaver, the second output bit from the $Y_2$ subblock interleaver, etc. Finally, the symbol-by-symbol multiplexed sequence of interleaved $W_1$ and $W_2$ subblock sequences may consist of the first output bit from the $W_1$ subblock interleaver, the first output bit from the $W_2$ subblock interleaver, the second output bit from the $W_1$ subblock interleaver, the second output bit from the $W_2$ subblock interleaver, etc.

Referring again to FIG. 5, the output of interleaver 520 may be input to puncturing block 530. Puncturing is a method used to reduce the number of codeword bits and increase the rate of the code. Generally, when performing puncturing, specific sequences of symbols are selected from the interleaved CTC encoder 510 output sequence. The resulting subpacket sequence is a binary sequence of symbols for output to the modulator (not shown) and subsequent transmission to a receiving device. In one exemplary embodiment, $Y_1$, $W_1$ may be the codeword corresponding to the pre-interleaved sequence A, B, and $Y_2$, $W_2$ may be the codeword corresponding to the post-interleaved sequence A, B. In some embodiments, puncturing may be referred to as symbol selection.

For the initial data transmission (i.e., RV0), the subpacket may be generated to select the consecutive interleaved bit sequence that starts from the first bit of the systematic (message) part of the data, and the length of the subpacket may be chosen according to the needed coding rate reflecting the channel condition. In some embodiments, the codeword may be transmitted with one of the subpackets. The symbols in a subpacket may be formed, for example, by selecting specific sequences of symbols from the interleaved CTC encoder 510 output sequence. The resulting subpacket sequence is a binary sequence of symbols for the modulator (not shown). In some embodiments, the first subpacket may also be used as a codeword with the needed coding rate for a burst where the HARQ mechanisms are not applied.

Figure 8A:
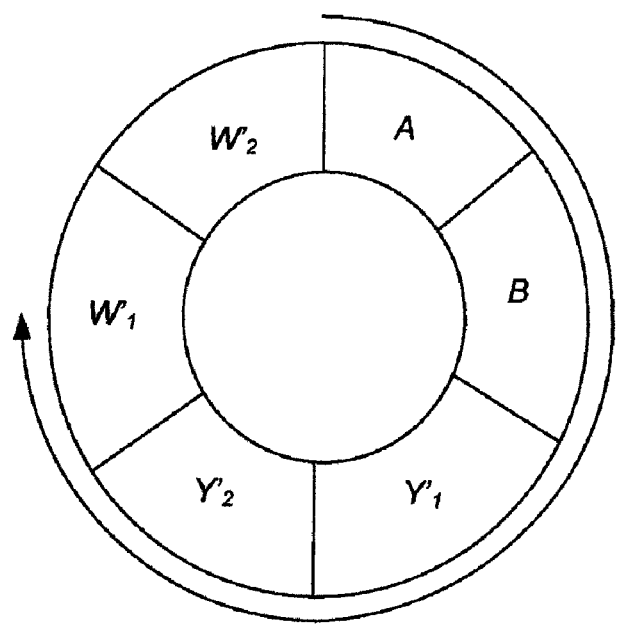
FIG. 8a is a diagram illustrating symbol selection using a circular buffer, consistent with certain disclosed embodiments.
Figure 8B:
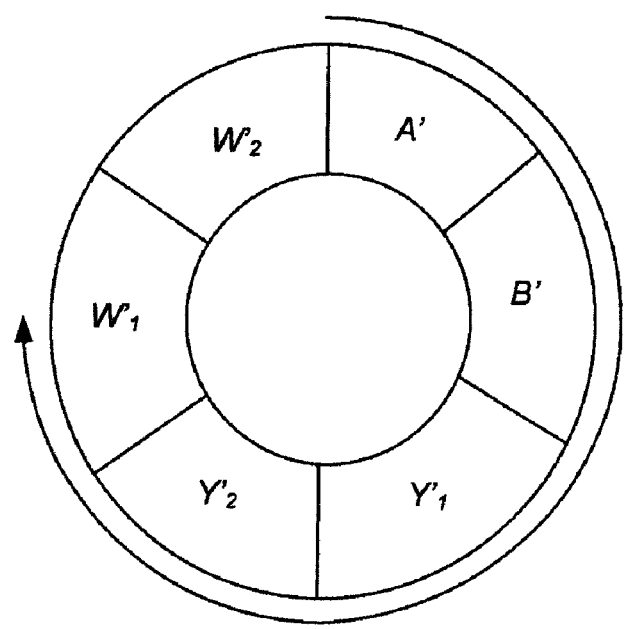
FIG. 8b is a diagram illustrating symbol selection using a circular buffer, consistent with certain disclosed embodiments.

FIGS. 8a and 8b illustrate exemplary methods of puncturing. As discussed above in connection with FIG. 5, puncturing may be performed to select the consecutive interleaved bit sequence of a whole codeword, beginning at any point of a whole codeword, for transmission to a receiving device.

As shown in FIG. 8a, using the exemplary output of interleaver 520a of FIG. 7a, for the first round of transmission, the data may be mapped into and read out of a circular buffer in the order of A, B, $Y'_1$, $Y'_2$, $W'_1$, $W'_2$, beginning with A. A symbol selection equation, e.g., Equation 2 below, may be used to select specific symbols from the data read out of the circular buffer. The resulting set of selected symbols form the data packet which may be sent to the modulator (not shown), and subsequently transmitted to a receiving device. Consecutive rounds may also read the data out of the circular buffer in the order of A, B, $Y'_1$, $Y'_2$, $W'_1$, $W'_2$. These consecutive rounds may be those associated with the creation of redundancy versions (RVs) and/or data retransmission.

Similarly, referring to FIG. 8b, using the exemplary output of interleaver 520b of FIG. 7b, the data may be mapped into and read out of a circular buffer in the order of A', B', $Y'_1$, $Y'_2$, $W'_1$, $W'_2$ beginning with A'. A symbol selection equation, e.g., Equation 2 below, may be used to select specific symbols from the data read out of the circular buffer. The resulting set of selected symbols form the data packet which may be sent to the modulator (not shown), and subsequently transmitted to a receiving device. Consecutive rounds may also read the data out of the circular buffer in the order of A', B', $Y'_1$, $Y'_2$, $W'_1$, $W'_2$.

As discussed above, symbol selection of the circular buffer output may performed according to Equation 2, as follows:

$$S_{k,i} = (F_k + i) \mod(3 N_{EP}) \quad \text{Equation 2}$$

wherein:
$i = 0, 1, 2, 3 \ldots, L_k - 1$;
$L_k = 48 * N_{SCHk} * m_k$; and
$F_k = (SPID_k * L_k) \mod(3 N_{EP})$.

Using Equation 2, the index of the i-th symbol for the k-th subpacket can be determined. In Equation 2, k may be the subpacket index when HARQ is enabled. For an initial transmission, k may be equal to 0, and may increase by 1 for each subsequent transmission. When there is more than one encoded block in a burst, the subpacket index for each encoded block may be the same.

$N_{EP}$ may be the number of bits in the data packet before encoding, and $N_{SCHk}$ may be the number of concatenated slots for the subpacket. In some embodiments, $N_{SCHk}$ may be equal to the $N_{SCH}$ that is defined for the HARQ CTC encoding scheme. For example, $N_{SCH}$ may be defined in IEEE 802.16e. The modulation order for the k-th subpacket may be $m_k$ (e.g., $m_k=2$ for QPSK, $m_k=4$ for 16-QAM, and $m_k=6$ for 64-QAM). $SPID_k$ may be the subpacket ID for the k-th subpacket. In some embodiments, $SPID_{k=0}=0$.

The $N_{EP}$, $N_{SCHk}$, $m_k$, and $SPID_k$ may be determined by the transmitting device (e.g., BS 110) and can be inferred by the receiving device (e.g., SS 130) based on the allocation size in the DL-MAP and the UL-MAP. Thus, the first transmission may include the systematic (message) part of the codeword. In embodiments where HARQ is not applied, the first transmission may be used as the codeword for a data burst. In addition, the location of the subpacket may be determined by the $SPID_k$ itself without information from previous packets.

Table 2 illustrates an exemplary symbol selection output for puncturing block 530 using the output of exemplary interleaver 520a.

TABLE 2

Exemplary Symbol Selection Output

| Code Rate | $SPID_k = 0$ | $SPID_k = 1$ | $SPID_k = 2$ | $SPID_k = 3$ |
|---|---|---|---|---|
| ½ | A, B, Y'$_1$, Y'$_2$ | W'$_1$, W'$_2$, A, B | Y'$_1$, Y'$_2$, W'$_1$, W'$_2$ | A, B, Y'$_1$, Y'$_2$ |
| ⅔ | A, B, Y'$_1$ | Y'$_2$, W'$_1$, W'$_2$ | A, B, Y'$_1$ | Y'$_2$, W'$_1$, W'$_2$ |

Table 3 illustrates an exemplary symbol selection output for puncturing block 530 using the output of exemplary interleaver 520b.

TABLE 3

Exemplary Symbol Selection Output

| Code Rate | $SPID_k = 0$ | $SPID_k = 1$ | $SPID_k = 2$ | $SPID_k = 3$ |
|---|---|---|---|---|
| ½ | A', B', Y'$_1$, Y'$_2$ | W'$_1$, W'$_2$, A', B' | Y'$_1$, Y'$_2$, W'$_1$, W'$_2$ | A', B', Y'$_1$, Y'$_2$ |
| ⅔ | A', B', Y'$_1$ | Y'$_2$, W'$_1$, W'$_2$ | A', B', Y'$_1$ | Y'$_2$, W'$_1$, W'$_2$ |

Figure 9A:
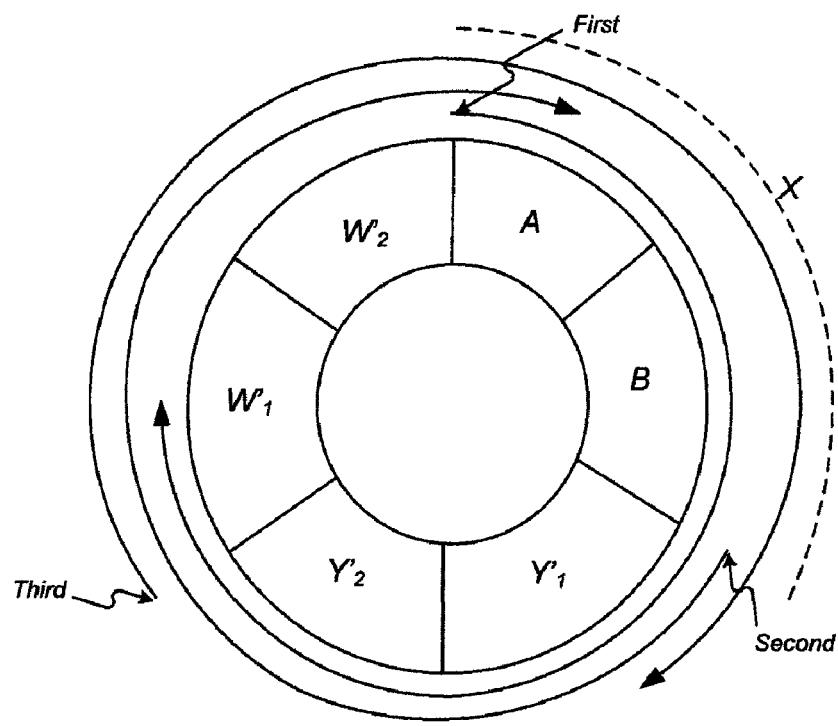
FIG. 9a is a diagram illustrating symbol selection using a circular buffer, consistent with certain disclosed embodiments.
Figure 9B:
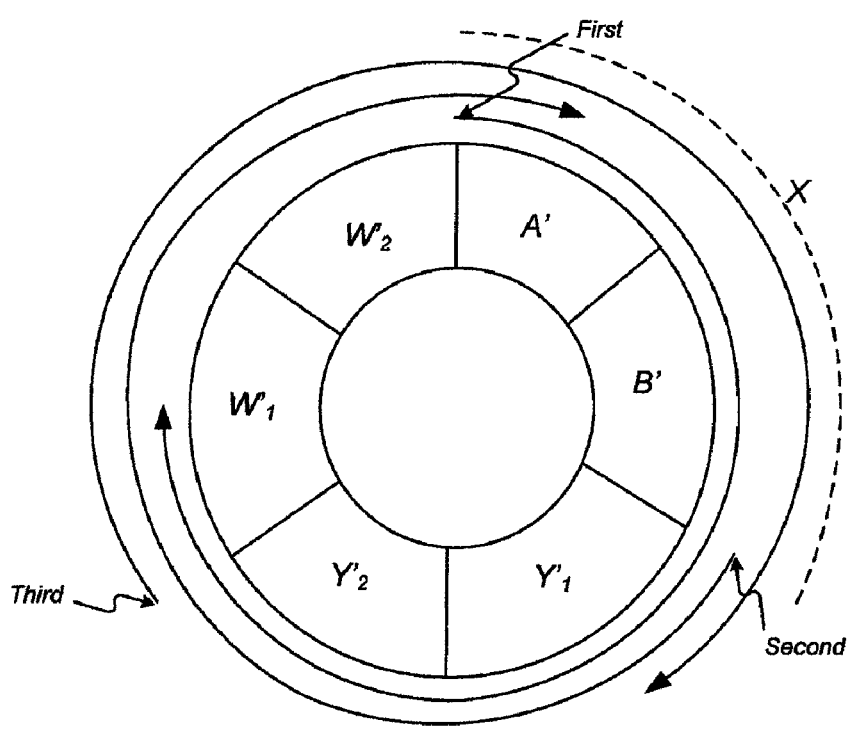
FIG. 9b is a diagram illustrating symbol selection using a circular buffer, consistent with certain disclosed embodiments.

FIGS. 9a and 9b illustrate an alternate exemplary method of puncturing. As discussed above in connection with FIGS. 8a and 8b, puncturing is a method used to reduce the number of codeword bits and increase the rate of the code. In some embodiments, puncturing may be referred to as bit selection.

In the exemplary method disclosed in FIGS. 9a and 9b, a first transmission of the encoded data may include all of the systematic (message) portion of the punctured data, whereas subsequent transmissions of the encoded data may include less of the systematic (message) portion of the punctured data, and more of the parity portion of the punctured data. As mentioned above in connection with FIG. 6, A and B (or A' and B') may be the systematic portion of the data, whereas Y'$_1$, W'$_1$, Y'$_2$, and W'$_2$ may be the parity portion of the data. Generally, less of the systematic (message) portion of the data may be sent in retransmissions by shifting a starting position at which the data is read from the circular buffer. More specifically, in some embodiments, a first transmission may include data bit-selected from the systematic portion of the data and a part of the coded parity data, and a subsequent transmission (e.g., second transmission, third transmission, fourth transmission, etc.) may include data not previously bit-selected from the systematic portion of the data and another part of the coded parity data. Once a complete codeword is selected, a subsequent transmission may first bit-select from the parity portion of the parity data, followed by bit-selection from the systematic portion of the data.

As shown in FIG. 9a, using the exemplary output of interleaver 520a of FIG. 7a, for the first round of transmission, the data may be read out of a circular buffer in the order of A, B, Y'$_1$, Y'$_2$, W'$_1$, W'$_2$, beginning with A. A symbol selection equation, e.g., Equation 3 below, may be used to select specific symbols from the data read out of the circular buffer. The resulting set of selected symbols form the data packet which may be sent to the modulator (not shown), and subsequently transmitted to a receiving device. Subsequent, consecutive rounds may also read the data out of the circular buffer in the order of A, B, Y'$_1$, Y'$_2$, W'$_1$, W'$_2$. However, in the example of FIG. 9a and using Equation 3 below, the beginning position of each subsequent, consecutive round may shift by a variable X. Thus, for example, the data may be read from the circular buffer beginning at a first position $P_1$ for a first round. In a second round, the data may be read from the circular buffer beginning at a second position $P_2$, where $P_2 = P_1 + X$ mod $(3N_{EP})$. And, for a third round, the data can be read from the circular buffer at a third position $P_3$, where $P_3 = P_2 + X$ mod $(3N_{EP})$. In some embodiments, X can be $N_{EP}$.

Similarly, using the exemplary output of interleaver 520b of FIG. 7b, the data may be read out of a circular buffer in the order of A', B', Y'$_1$, W'$_1$, Y'$_2$, W'$_2$ beginning with the first symbol A'. Consecutive rounds may also read the data out of the circular buffer in the order of A', B', Y'$_1$, W'$_1$, Y'$_2$, W'$_2$, but may shift by a variable X for each subsequent round.

Thus, symbol selection as shown in FIGS. 9a and 9b may performed according to Equation 3, as follows:

$$S_{k,i} = \begin{cases} (F_k + i) \bmod (3N_{EP}) & (F_k + i) < 3N_{EP} \\ (F_k + i + X) \bmod (3N_{EP}) & (F_k + i) \geq 3N_{EP} \end{cases} \quad \text{Equation 3}$$

wherein:
i = 0, 1, 2, 3 ..., $L_k$−1;
$L_k = 48 * N_{SCHk} * m_k$;
$F_k = (SPID_k * L_k)$; and
$0 < X < 3N_{EP}$, X can be $N_{EP}$.

Using Equation 3, the index of the i-th symbol for the k-th subpacket can be determined. In Equation 3, k may be the subpacket index when HARQ is enabled. For an initial transmission, k may be equal to 0, and may increase by 1 for each subsequent transmission. When there is more than one encoded block in a burst, the subpacket index for each encoded block may be the same.

$N_{EP}$ may be the number of bits input to CTC encoder 510, and $N_{SCHk}$ may be the number of concatenated slots for the subpacket. In some embodiments, $N_{SCHk}$ may be equal to the $N_{SCH}$ that is defined for the HARQ CTC encoding scheme. For example, $N_{SCH}$ may be defined in IEEE 802.16(e). The modulation order for the k-th subpacket may be $m_k$ (e.g., $m_k=2$ for QPSK, $m_k=4$ for 16-QAM, and $m_k=6$ for 64-QAM). $SPID_k$ may be the subpacket ID for the k-th subpacket. In some embodiments, $SPID_{k=0}=0$.

Table 4 illustrates an exemplary symbol selection output for puncturing block 530 using the output of exemplary interleaver 520a.

TABLE 4

Exemplary Symbol Selection Output

| Code Rate | $SPID_k = 0$ | $SPID_k = 1$ | $SPID_k = 2$ | $SPID_k = 3$ |
|---|---|---|---|---|
| ½ | A, B, Y'$_1$, Y'$_2$ | W'$_1$, W'$_2$, Y'$_1$, Y'$_2$ | W'$_1$, W'$_2$, A, B | Y'$_1$, Y'$_2$, W'$_1$, W'$_2$ |
| ⅔ | A, B, Y'$_1$ | Y'$_2$, W'$_1$, W'$_2$ | Y'$_1$, Y'$_2$, W'$_1$ | W'$_2$, A, B |

Table 5 illustrates an exemplary symbol selection output for puncturing block 530 using the output of exemplary interleaver 520b.

TABLE 5

Exemplary Symbol Selection Output

| Code Rate | $SPID_k = 0$ | $SPID_k = 1$ | $SPID_k = 2$ | $SPID_k = 3$ |
|---|---|---|---|---|
| ½ | A', B', Y'$_1$, Y'$_2$ | W'$_1$, W'$_2$, Y'$_1$, Y'$_2$ | W'$_1$, W'$_2$, A', B' | Y'$_1$, Y'$_2$, W'$_1$, W'$_2$ |
| ⅔ | A', B', Y'$_1$ | Y'$_2$, W'$_1$, W'$_2$ | Y'$_1$, Y'$_2$, W'$_1$ | W'$_2$, A', B' |

The $N_{EP}$, $N_{SCHk}$, $m_k$, and $SPID_k$ may be determined by the transmitting device (e.g., BS 110) and can be inferred by the receiving device (e.g., SS 130) based on the allocation size in the DL-MAP and the UL-MAP. In addition, the location of the subpacket may be determined by the $SPID_k$ itself without information from previous packets. In some embodiments, the first transmission may include the systematic (message) part of the codeword. In embodiments where HARQ is not applied, the first transmission may be used as the codeword for a data burst.

Thus, the output of puncturing block 530 may include the encoded HARQ PDU and one or more codewords. The transmitting device (e.g., BS 110, RS 120, etc.) may transmit the encoded HARQ PDU and one or more codewords to one or more receiving devices (e.g., RS 120, SS 130, etc.) using either point-to-point (P2P) or point-to-multipoint (PTM) transmission. The one or more receiving devices (e.g., RS 120, SS 130, etc.) may receive the encoded HARQ PDU and one or more codewords, and using the provided codewords, may decode the encoded HARQ PDU.

The disclosed embodiments may be implemented within any network configuration utilizing IEEE 802.16 technology, protocols, or standards. The methods and apparatus as discussed in connection with the disclosed embodiments may be configured to operate in any transmitting and/or receiving device. For example, RS 120 may be configured to operate according to the systems and methods of the disclosed embodiments. Similarly, SS 130 may be configured to operate according to the systems and methods of the disclosed embodiments. In this manner, the disclosed embodiments may reduce signal processing time and improve data traffic flow associated with error detection and retransmission of data in IEEE 802.16-based networks.

It will be apparent to those skilled in the art that various modifications and variations can be made in the system and method for reducing signal interference in communication networks. It is intended that the standard and examples be considered as exemplary only, with a true scope of the disclosed embodiments being indicated by the following claims and their equivalents.

What is claimed is:

1. A method for encoding data in a wireless communication system, comprising:
    receiving an information sequence;
    encoding the received information sequence to generate three subblocks of sequences, wherein a first subblock of the three subblocks is the information sequence, a second subblock of the three subblocks is an encoded sequence, and a third subblock of the three subblocks is an interleaved and encoded sequence;
    permuting the three subblocks of encoded sequences separately by subblock permutation;
    inter-subblock permuting the second subblock and the third subblock to generate a fourth subblock and a fifth subblock;
    continuously mapping the first subblock, the fourth subblock, and the fifth subblock into a circular buffer, the circular buffer including a first part, a second part, and a third part;
    bit-selecting bits from the circular buffer, in a circular order corresponding to the first part, the second part, and the third part, to generate a plurality of redundancy versions, wherein bit-selection for a first redundancy version of the plurality of redundancy versions begins at a first position in the circular buffer, bit-selection for each successive redundancy version of the plurality of redundancy versions begins after a last position in the circular buffer corresponding to a previous redundancy version, and wherein, when a complete codeword is selected, bit-selection is offset from the first position by a fixed number of bits X; and
    transmitting at least one redundancy version of the plurality of redundancy versions to at least one receiving device.

2. The method as in claim 1, wherein the plurality of redundancy versions includes at least one codeword.

3. The method as in claim 1, wherein transmitting the at least one redundancy version further includes:
    transmitting the first redundancy version to the at least one receiving device in a first transmission packet; and
    transmitting, if a NACK associated with the first transmission packet is received from the at least one receiving device, a second redundancy version of the plurality of redundancy versions to the at least one receiving device in a second transmission packet.

4. The method as in claim 3, wherein transmitting the at least one redundancy version further includes:
    transmitting, if a NACK associated with the second transmission packet is received from the at least one receiving device, a third redundancy version of the plurality of redundancy versions to the at least one receiving device in a third transmission packet.

5. The method as in claim 4, wherein transmitting the at least one redundancy version further includes:
    transmitting, if a NACK associated with the third transmission packet is received from the at least one receiving device, a fourth redundancy version of the plurality of redundancy versions to the at least one receiving device in a fourth transmission packet.

6. The method as in claim 1, wherein the received information sequence is encoded according to convolutional turbo code encoding.

7. An apparatus for bit-selection in a wireless communication system, comprising:
    at least one circular buffer including a first part, a second part, and a third part;
    at least one encoding unit configured to:
        receive an information sequence, and
        encode the received information sequence to generate three subblocks of sequences, wherein a first subblock of the three subblocks is the information sequence, a second subblock of the three subblocks is an encoded sequence, and a third subblock of the three subblocks is an interleaved and encoded sequence; and
    at least one permuting unit configured to:
        permute the three subblocks of encoded sequences separately by subblock permutation,
        inter-subblock permute the second subblock and the third subblock to generate a fourth subblock and a fifth subblock,
        continuously map the first subblock, the fourth subblock, and the fifth subblock into the at least one circular buffer,
        bit-select bits from the at least one circular buffer, in a circular order corresponding to the first part, the second part, and the third part, to generate a plurality of redundancy versions, wherein bit-selection for a first redundancy version of the plurality of redundancy versions begins at a first position in the circular buffer, bit-selection for each successive redundancy version of the plurality of redundancy versions begins after a last position in the circular buffer corresponding to a previous redundancy version, and wherein, when a complete codeword is selected, bit-selection is offset from the first position by a fixed number of bits X, and output at least one redundancy version of the plurality of redundancy versions for transmission to at least one receiving device.

8. The apparatus as in claim 7, wherein the plurality of redundancy versions include at least one codeword.

9. The apparatus as in claim 7, wherein when the at least one permuting is configured to output the at least one redundancy version, the at least one permuting unit is further configured to:
output the first redundancy version for transmission to the at least one receiving device in a first transmission packet; and
output, if a NACK associated with the first transmission packet is received from the at least one receiving device, a second redundancy version for transmission to the at least one receiving device in a second transmission packet.

10. The apparatus as in claim 9, wherein when the at least one permuting is configured to output the at least one redundancy version, the at least one permuting unit is further configured to:
output, if a NACK associated with the second transmission packet is received from the at least one receiving device, a third redundancy version of the plurality of redundancy versions to the at least one receiving device in a third transmission packet.

11. The apparatus as in claim 10, wherein when the at least one permuting is configured to output the at least one redundancy version, the at least one permuting unit is further configured to:
output, if a NACK associated with the third transmission packet is received from the at least one receiving device, a fourth redundancy version for transmission to the at least one receiving device in a fourth transmission packet.

12. The apparatus as in claim 11, wherein the received information sequence is encoded according to convolutional turbo code encoding.

13. A method for encoding data in a wireless communication system, comprising:
receiving a first information sequence and a second information sequence;
encoding the received first information sequence and the received second information sequence to generate six subblocks of sequences, wherein a first subblock of the six subblocks is the first information sequence, a second subblock of the six subblocks is the second information sequence, a third subblock of the six subblocks is an encoded sequence, a fourth subblock of the six subblocks is an encoded sequence, a fifth subblock of the six subblocks is an interleaved and encoded sequence, and a sixth subblock of the six subblocks is an interleaved and encoded sequence;
permuting the six subblocks of encoded sequences separately by subblock permutation;
inter-subblock permuting the third subblock and the fifth subblock to generate a seventh and a ninth subblock;
inter-subblock permuting the fourth subblock and the sixth subblock to generate an eighth and a tenth subblock;
continuously mapping the first subblock, the second subblock, the seventh subblock, the eighth subblock, the ninth subblock, and the tenth subblock into a circular buffer, the circular buffer including a first part, a second part, a third part, a fourth part, a fifth part, and a sixth part;
bit-selecting bits from the circular buffer, in a circular order corresponding to the first part, the second part, the third part, the fourth part, the fifth part, and the sixth part, to generate a first redundancy version and a second redundancy version, wherein bit-selection for a first redundancy version of the plurality of redundancy versions begins at a first position in the circular buffer, bit-selection for each successive redundancy version of the plurality of redundancy versions begins after a last position in the circular buffer corresponding to a previous redundancy version, and wherein, when a complete codeword is selected, bit-selection is offset from the first position by a fixed number of bits X; and
transmitting at least one redundancy version of the plurality of redundancy versions to at least one receiving device.

14. The method as in claim 13, wherein the plurality of redundancy versions includes at least one codeword.

15. The method as in claim 13, wherein transmitting the at least one redundancy version further includes:
transmitting the first redundancy version to the at least one receiving device in a first transmission packet; and
transmitting, if a NACK associated with the first transmission packet is received from the at least one receiving device, a second redundancy version for transmission to the at least one receiving device in a second transmission packet.

16. The method as in claim 15, wherein transmitting the at least one redundancy version further includes:
transmitting, if a NACK associated with the second transmission packet is received from the at least one receiving device, a third redundancy version for transmission to the at least one receiving device in a third transmission packet.

17. The method as in claim 16, wherein transmitting the at least one redundancy version further includes:
transmitting, if a NACK associated with the third transmission packet is received from the at least one receiving device, a fourth redundancy version for transmission to the at least one receiving device in a fourth transmission packet.

18. The method as in claim 13, wherein the received first information sequence is encoded according to convolutional turbo code encoding.

19. An apparatus for bit-selection in a wireless communication system, comprising:
at least one circular buffer including a first part, a second part, a third part, a fourth part, a fifth part, and a sixth part;
at least one encoding unit configured to:
receive a first information sequence and a second information sequence, and
encode the received first information sequence and the received second information sequence to generate six subblocks of sequences, wherein a first subblock of the six subblocks is the first information sequence, a second subblock of the six subblocks is the second information sequence, a third subblock of the six subblocks is an encoded sequence, a fourth subblock of the six subblocks is an encoded sequence, a fifth subblock of the six subblocks is an interleaved and encoded sequence, and a sixth subblock of the six subblocks is an interleaved and encoded sequence; and
at least one permuting unit configured to:
permute the six subblocks of encoded sequences separately by subblock permutation, inter-subblock permute the third subblock and the fifth subblock to generate a seventh and a ninth subblock, inter-subblock permute the fourth subblock and the sixth subblock to generate an eighth and a tenth subblock, continuously map the first subblock, the second subblock, the seventh subblock, the eighth subblock, the ninth subblock, and the tenth subblock into the at least one circular buffer, bit-select bits from the at least one circular buffer, in a circular order corresponding to the first part, the second part, the third part, the fourth part, the fifth part, and the sixth part, to generate a plurality of redundancy versions, wherein bit-selection for a first redundancy version of the plurality of redundancy versions begins at a first position in the circular buffer, bit-selection for each successive redundancy version of the plurality of redundancy versions begins after a last position in the circular buffer corresponding to a previous redundancy version, and wherein, when a complete codeword is selected, bit-selection is offset from the first position by a fixed number of bits X, and output at least one redundancy version of the plurality of redundancy versions for transmission to at least one receiving device.

20. The apparatus as in claim 19, wherein the at least one redundancy version includes at least one codeword.

21. The apparatus as in claim 19, wherein when the at least one permuting unit is configured to output the at least one redundancy version, the at least one permuting unit is further configured to:

output the first redundancy version for transmission to the at least one receiving device in a first transmission packet; and output, if a NACK associated with the first transmission packet is received from the at least one receiving device, a second redundancy version for transmission to the at least one receiving device in a second transmission packet.

22. The apparatus as in claim 21, wherein when the at least one permuting unit is configured to output the at least one redundancy version, the at least one permuting unit is further configured to:

output, if a NACK associated with the second transmission packet is received from the at least one receiving device, a third redundancy version of the plurality of redundancy versions to the at least one receiving device in a third transmission packet.

23. The apparatus as in claim 22, wherein when the at least one permuting unit is configured to output the at least one redundancy version, the at least one permuting unit is further configured to:

output, if a NACK associated with the third transmission packet is received from the at least one receiving device, a fourth redundancy version of the plurality of redundancy versions to the at least one receiving device in a fourth transmission packet.

24. The apparatus as in claim 22, wherein the received first information sequence is encoded according to convolutional turbo code encoding.

25. A method for encoding data in a wireless communication system, comprising:

receiving a first information sequence and a second information sequence;

encoding the received first information sequence and the received second information sequence to generate six subblocks of sequences, wherein a first subblock of the six subblocks is the first information sequence, a second subblock of the six subblocks is the second information sequence, a third subblock of the six subblocks is an encoded sequence, a fourth subblock of the six subblocks is an encoded sequence, a fifth subblock of the six subblocks is an interleaved and encoded sequence, and a sixth subblock of the six subblocks is an interleaved and encoded sequence;

permuting the six subblocks of encoded sequences separately by subblock permutation;

inter-subblock permuting the first subblock and the second subblock to generate a seventh and an eighth subblock;

inter-subblock permuting the third subblock and the fifth subblock to generate a ninth and an eleventh subblock;

inter-subblock permuting the fourth subblock and the sixth subblock to generate a tenth and a twelfth subblock;

continuously mapping the seventh subblock, the eighth subblock, the ninth subblock, the tenth subblock, the eleventh subblock, and the twelfth subblock into a circular buffer, the circular buffer including a first part, a second part, a third part, a fourth part, a fifth part, and a sixth part;

bit-selecting bits from the circular buffer, in a circular order corresponding to the first part, the second part, the third part, the fourth part, the fifth part, and the sixth part, to generate a plurality of redundancy versions, wherein bit-selection for a first redundancy version of the plurality of redundancy versions begins at a first position in the circular buffer, bit-selection for each successive redundancy version of the plurality of redundancy versions begins after a last position in the circular buffer corresponding to a previous redundancy version, and wherein, when a complete codeword is selected, bit-selection is offset from the first position by a fixed number of bits X; and transmitting at least one redundancy version of the plurality of redundancy versions to at least one receiving device.

26. The method as in claim 25, wherein the plurality of redundancy versions includes at least one codeword.

27. The method as in claim 26, wherein transmitting the at least one redundancy version further includes:

transmitting the first redundancy version to the at least one receiving device in a first transmission packet; and transmitting, if a NACK associated with the first transmission packet is received from the at least one receiving device, a second redundancy version for transmission to the at least one receiving device in a second transmission packet.

28. The method as in claim 27, wherein transmitting the at least one redundancy version further includes:

transmitting, if a NACK associated with the second transmission packet is received from the at least one receiving device, a third redundancy version for transmission to the at least one receiving device in a third transmission packet.

29. The method as in claim 28, wherein transmitting the at least one redundancy version further includes:

transmitting, if a NACK associated with the third transmission packet is received from the at least one receiving device, a fourth redundancy version for transmission to the at least one receiving device in a fourth transmission packet.

30. The method as in claim 25, wherein the received first information sequence is encoded according to convolutional turbo code encoding.

31. An apparatus for bit-selection in a wireless communication system, comprising:

at least one circular buffer including a first part, a second part, a third part, a fourth part, a fifth part, and a sixth part;

at least one encoding unit configured to:
receive a first information sequence and a second information sequence, and
encode the received first information sequence and the received second information sequence to generate six subblocks of sequences, wherein a first subblock of the six subblocks is the first information sequence, a second subblock of the six subblocks is the second information sequence, a third subblock of the six subblocks is an encoded sequence, a fourth subblock of the six subblocks is an encoded sequence, a fifth subblock of the six subblocks is an interleaved and encoded sequence, and a sixth subblock of the six subblocks is an interleaved and encoded sequence; and at least one permuting unit configured to:
permute the six subblocks of encoded sequences separately by subblock permutation;
inter-subblock permute the first subblock and the second subblock to generate a seventh and an eighth subblock;
inter-subblock permute the third subblock and the fifth subblock to generate a ninth and an eleventh subblock;
inter-subblock permute the fourth subblock and the sixth subblock to generate a tenth and a twelfth subblock;
continuously map the seventh subblock, the eighth subblock, the ninth subblock, the tenth subblock, the eleventh subblock, and the twelfth subblock into a circular buffer, the circular buffer including a first part, a second part, a third part, a fourth part, a fifth part, and a sixth part;
bit-select bits from the at least one circular buffer, in a circular order corresponding to the first part, the second part, the third part, the fourth part, the fifth part, and the sixth part, to generate a plurality of redundancy versions, wherein bit-selection for a first redundancy version of the plurality of redundancy versions begins at a first position in the circular buffer, bit-selection for each successive redundancy version of the plurality of redundancy versions begins after a last position in the circular buffer corresponding to a previous redundancy version, and wherein, when a complete codeword is selected, bit-selection is offset from the first position by a fixed number of bits X, and
output at least one redundancy version of the plurality of redundancy versions for transmission to at least one receiving device.

32. The apparatus as in claim 31, wherein the at least one redundancy version includes at least one codeword.

33. The apparatus as in claim 31, wherein when the at least one permuting unit is configured to output the at least one redundancy version, the at least one permuting unit is further configured to:
output the first redundancy version for transmission to the at least one receiving device in a first transmission packet; and
output, if a NACK associated with the first transmission packet is received from the at least one receiving device, a second redundancy version for transmission to the at least one receiving device in a second transmission packet.

34. The apparatus as in claim 33, wherein when the at least one permuting unit is configured to output the at least one redundancy version, the at least one permuting unit is further configured to:
output, if a NACK associated with the second transmission packet is received from the at least one receiving device, a third redundancy version of the plurality of redundancy versions to the at least one receiving device in a third transmission packet.

35. The apparatus as in claim 34, wherein when the at least one permuting unit is configured to output the at least one redundancy version, the at least one permuting unit is further configured to:
output, if a NACK associated with the third transmission packet is received from the at least one receiving device, a fourth redundancy version of the plurality of redundancy versions to the at least one receiving device in a fourth transmission packet.

36. The apparatus as in claim 31, wherein the received first information sequence is encoded according to convolutional turbo code encoding.

37. A method for encoding data in a wireless communication system, comprising:
receiving an information sequence;
encoding the received information sequence by turbo code encoding to generate a coded sequence including a coded information sequence and a coded parity sequence;
bit-selecting from the coded sequence to obtain a plurality of redundancy versions for Hybrid Automatic Request (HARQ) transmissions, wherein a first transmission bit-selects from the coded information sequence and a part of the coded parity sequence, a next transmission bit-selects from the coded sequence not selected during the first transmission, and when a complete codeword is chosen once, a subsequent transmission bit-selects first from the parity sequence and then bit-selects from the information sequence.

* * * * *